(12) United States Patent
Younes et al.

(10) Patent No.: US 11,613,188 B2
(45) Date of Patent: Mar. 28, 2023

(54) VEHICLE SEAT COMPRISING A RESTRAINT SYSTEM FOR THE ADJUSTMENT AND SUSPENSION DEVICE

(71) Applicant: Faurecia Sièges d'Automobile, Nanterre (FR)

(72) Inventors: Mustapha Younes, Villeneuve la Garenne (FR); Sébastien Seille, Briis-sous-Forges (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/244,677

(22) Filed: Apr. 29, 2021

(65) Prior Publication Data
US 2021/0339659 A1   Nov. 4, 2021

(30) Foreign Application Priority Data

Apr. 30, 2020 (FR) ...................... 20 04323

(51) Int. Cl.
*B60N 2/42* (2006.01)
*B60N 2/015* (2006.01)
(Continued)

(52) U.S. Cl.
CPC ............... *B60N 2/42* (2013.01); *B60N 2/015* (2013.01); *B60N 2/0727* (2013.01); *B60N 2/50* (2013.01)

(58) Field of Classification Search
CPC ...... B60N 2/42; B60N 2/4207; B60N 2/4214; B60N 2/4221; B60N 2/4228; B60N 2/4235; B60N 2/4249; B60N 2/4267; B60N 2/42727; B60N 2/42736; B60N 2/015; B60N 2/50; B60N 2/06; B60N 2/062; B60N 2/07; B60N 2/0727; B60N 2/2884; B60N 2/4263; B60N 2/42718; B60N 2/42763
See application file for complete search history.

(56) References Cited

U.S. PATENT DOCUMENTS 1,647,247 A   11/1927  Pallenberg
3,944,302 A * 3/1976  Fourrey ............... B60N 2/0705
                                                        384/47
(Continued)

FOREIGN PATENT DOCUMENTS

EP   1050428 A1   11/2000
FR    743388 A     3/1933

OTHER PUBLICATIONS

French Search Report corresponding to French Application No. FR 20 04323, dated Jan. 20, 2021, 2 pages.

*Primary Examiner* — Kyle J. Walraed-Sullivan
(74) *Attorney, Agent, or Firm* — Reising Ethington P.C.

(57) ABSTRACT

A seat for a vehicle includes a seat cushion and an adjustment and suspension device having a base fixed to the frame and a supporting plate fixed to the seat cushion movable in translation relative to the base in a direction of elevation. The seat also has a restraint system that includes: at least one restraint member fixed to the frame, the restraint member defining at least one through opening extending along a main direction of elongation substantially parallel to the direction of elevation; and at least one restraint element fixed to the supporting plate, the through opening of the restraint member receiving the restraint element free in translation along the main direction of elongation.

12 Claims, 5 Drawing Sheets

(51) Int. Cl.
*B60N 2/50* (2006.01)
*B60N 2/07* (2006.01)

(56) References Cited

U.S. PATENT DOCUMENTS

| | | | | |
|---|---|---|---|---|
| 4,556,263 A * | 12/1985 | Chevalier | ............... | B60N 2/07 296/65.14 |
| 5,290,091 A * | 3/1994 | Dellanno | ............... | B60N 2/847 297/216.12 |
| 5,454,541 A * | 10/1995 | Ito | ............... | B60N 2/0727 248/345.1 |
| 5,605,368 A * | 2/1997 | Noma | ............... | B60N 2/0825 296/65.13 |
| 5,626,203 A * | 5/1997 | Habib | ............... | B60N 2/0276 180/274 |
| 5,685,603 A * | 11/1997 | Lane, Jr. | ............... | B60N 2/2884 297/252 |
| 6,186,467 B1 * | 2/2001 | Wahls | ............... | B60N 2/505 248/404 |
| 6,220,642 B1 * | 4/2001 | Ito | ............... | B60N 2/0232 296/65.14 |
| 9,403,448 B1 * | 8/2016 | Evans | ............... | B60W 10/06 |
| 11,225,201 B2 * | 1/2022 | Moulin | ............... | F16M 13/02 |
| 2001/0037908 A1 * | 11/2001 | Motozawa | ............... | B62D 21/152 296/68.1 |
| 2001/0038223 A1 * | 11/2001 | Suga | ............... | B60N 2/062 296/65.11 |
| 2004/0075292 A1 * | 4/2004 | Rausch | ............... | B60N 2/366 296/65.13 |
| 2005/0218684 A1 * | 10/2005 | Sumida | ............... | B60N 2/06 296/64 |
| 2006/0263164 A1 * | 11/2006 | Dowty | ............... | B64D 11/0619 410/105 |
| 2007/0205626 A1 * | 9/2007 | Ohtsubo | ............... | B60N 2/067 296/75 |
| 2007/0273186 A1 * | 11/2007 | Kurita | ............... | B60N 2/42736 297/216.1 |
| 2007/0296252 A1 * | 12/2007 | Mattes | ............... | B60N 2/42736 297/216.1 |
| 2009/0108645 A1 * | 4/2009 | Nilakantan | ............... | B60N 2/4228 297/216.12 |
| 2010/0164267 A1 * | 7/2010 | Maier | ............... | B60N 2/0715 297/344.1 |
| 2011/0101194 A1 * | 5/2011 | Wetzig | ............... | B60N 2/0727 248/429 |
| 2011/0298240 A1 * | 12/2011 | Jaranson | ............... | B60N 3/06 297/452.1 |
| 2012/0318949 A1 * | 12/2012 | Braun | ............... | B60N 2/01575 384/34 |
| 2013/0284875 A1 * | 10/2013 | Enokijima | ............... | B60N 2/4249 248/429 |
| 2014/0070578 A1 * | 3/2014 | Szelagowski | ............... | B60N 2/42745 297/216.13 |
| 2015/0158401 A1 * | 6/2015 | Keller | ............... | B60N 2/4221 297/216.19 |
| 2015/0321582 A1 * | 11/2015 | Sasaki | ............... | B60N 2/07 248/430 |
| 2016/0144752 A1 * | 5/2016 | Frank | ............... | B60N 2/2821 297/216.11 |
| 2016/0207427 A1 * | 7/2016 | Wang | ............... | B60N 2/42709 |
| 2016/0339808 A1 * | 11/2016 | Mizuno | ............... | B60N 2/062 |
| 2017/0113575 A1 * | 4/2017 | Epaud | ............... | B60N 2/12 |
| 2017/0274999 A1 * | 9/2017 | Alamgir | ............... | B64D 11/06 |
| 2018/0215290 A1 * | 8/2018 | Varcus | ............... | B60N 2/42709 |
| 2019/0118678 A1 * | 4/2019 | Stevens | ............... | B60N 2/06 |
| 2019/0232884 A1 * | 8/2019 | Yamada | ............... | B60R 11/02 |
| 2020/0215942 A1 * | 7/2020 | Macliver | ............... | B60N 2/2884 |
| 2022/0017027 A1 * | 1/2022 | Long | ............... | B60R 16/0215 |
| 2022/0097576 A1 * | 3/2022 | Zhang | ............... | B60N 2/2863 |

* cited by examiner

VEHICLE SEAT COMPRISING A RESTRAINT SYSTEM FOR THE ADJUSTMENT AND SUSPENSION DEVICE

CROSS-REFERENCE TO RELATED APPLICATION

This application claims the benefit of French Patent Application No. FR 20 04323 filed on Apr. 30, 2020, which is hereby incorporated by reference.

TECHNICAL FIELD

The present invention relates to a vehicle seat comprising a frame intended to be mounted on a floor of the vehicle, a seat cushion, an adjustment and suspension device comprising a base fixed to the frame and a plate fixed to a lower surface of the seat cushion, the plate being mounted movable in translation relative to the base in a direction of elevation.

BACKGROUND

This type of seat is for example fixed inside a commercial vehicle such as a van, a truck, a pick-up truck, a refrigerated vehicle, etc.

In the event of a vehicle frontal impact, the seat and its occupant may be suddenly stopped in their movement. They may then move forward relative to the vehicle by inertia in the longitudinal direction. In particular, the plate for the adjustment and suspension device might move and pivot forward about a transverse axis substantially perpendicular to the direction of travel of the vehicle. This could cause the occupant's pelvis to move significantly forward by sliding along the seat cushion, rather than maintaining the occupant in place relative to the vehicle.

SUMMARY

One object of the invention is to address this drawback by proposing a seat that enables limiting the displacement of the occupant's pelvis during a vehicle impact and improving the stability and strength of the seat.

To this end, the invention relates to a seat of the above mentioned type in which the seat further comprises a restraint system that restrains the plate for the adjustment and suspension device on the frame, the restraint system comprising:
  at least one restraint member fixed to the frame, the restraint member defining at least one through opening extending along a main direction of elongation substantially parallel to the direction of elevation,
  at least one restraint element fixed to the plate, the through opening of the restraint member receiving the restraint element free in translation along the main direction of elongation, the through opening being capable of restraining said restraint element (60) along a restraint direction substantially perpendicular to the vertical direction in the event of vehicle impact.

Thus, thanks to the restraint member and the restraint element, the plate for the adjustment and suspension device cannot move forward in the longitudinal direction during impact on the vehicle, regardless of the position of the plate and therefore of the seat cushion in the direction of elevation before the impact. During impact, the plate and the seat cushion can no longer rotate relative to the frame, and the movement of the seat occupant's pelvis is limited.

According to different embodiments, the seat further comprises one or more of the following features, taken alone or in any technically possible combination:
  the restraint system comprises:
    two restraint members fixed to the frame, each restraint member defining at least one through opening extending along a main direction of elongation substantially parallel to the direction of elevation,
    at least two restraint elements fixed to two opposite walls of the plate, the two walls extending primarily in a longitudinal direction or in a transverse direction, the longitudinal and transverse directions being substantially perpendicular to the direction of elevation,
  the or each restraint element extends from the wall to which said restraint member is fixed,
  the restraint members are arranged opposite each other, on either side of the frame,
  the frame defines a central housing receiving the adjustment and suspension device,
  the or each restraint member defines two through openings, each extending in an direction of elongation substantially parallel to the direction of elevation, the plate comprising four restraint elements received in pairs in the through openings of the restraint members
  the or each restraint member comprises at least one plate defining the opening(s) and extending primarily along an elongation plane at least partly projecting from an upper surface of the frame, said elongation plane being substantially parallel to the direction of elevation,
  the elongation plane of the plate is substantially parallel to the transverse direction
  the frame comprises a front section and a rear section extending primarily in a direction parallel to the transverse direction and two side sections connecting the front and rear sections extending primarily in a direction parallel to the longitudinal direction, the or each plate being fixed substantially equidistant from the side sections along the front section and rear section, and/or
  the elongation plane of the plate is substantially parallel to the longitudinal direction, an edge of the through opening defining a plurality of restraint housings adapted to restrain the restraint element received in the through opening along the direction of restraint.

BRIEF DESCRIPTION OF THE DRAWINGS

Further aspects and advantages of the invention will become apparent from the following description, given by way of example and made with reference to the appended drawings in which.

DETAILED DESCRIPTION OF EMBODIMENTS

In the following description, the term "longitudinal" is defined in relation to the direction the vehicle normally travels, that is, the main direction of elongation of the vehicle interior in which a seat according to the invention is placed under usual conditions of use, that is, the seat occupant is facing the road.

The term "transverse" is defined with respect to a direction substantially perpendicular to the longitudinal direction L. This direction corresponds to the width of the vehicle. The direction of elevation Z is substantially perpendicular to the longitudinal L and transverse T directions and corresponds to the height of the vehicle. The direction of elevation Z is substantially vertical when the vehicle is on level ground. The terms "front" and "rear" are defined with respect to the direction of the vehicle's usual direction of travel in the longitudinal direction L. Similarly, the terms "upper" and "lower" are defined with respect to the direction of elevation.

Figure 1:
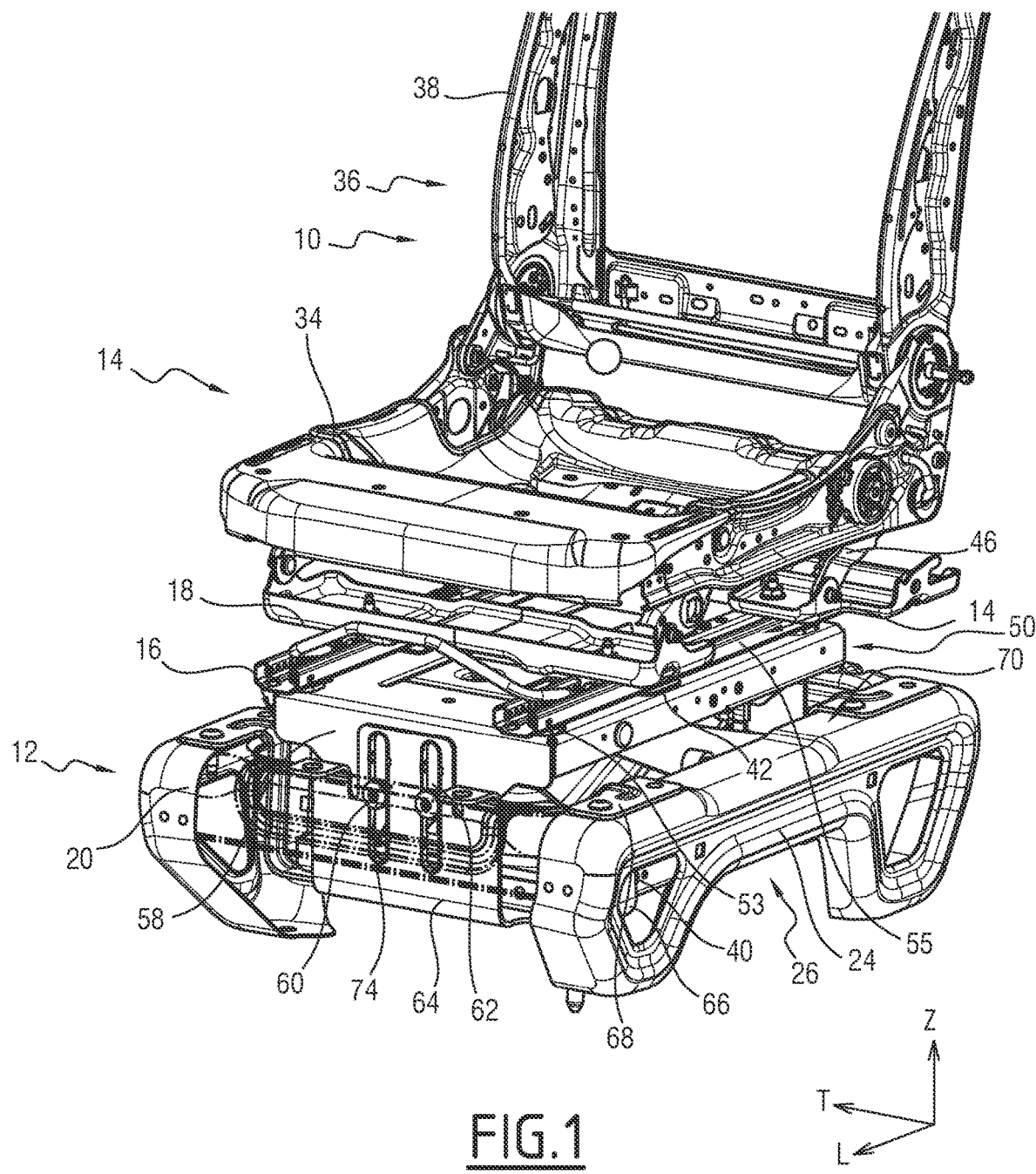
FIG. 1 is a perspective view of a seat according to an embodiment of the invention wherein the adjustment and suspension device is in an intermediate position.
Figure 2:
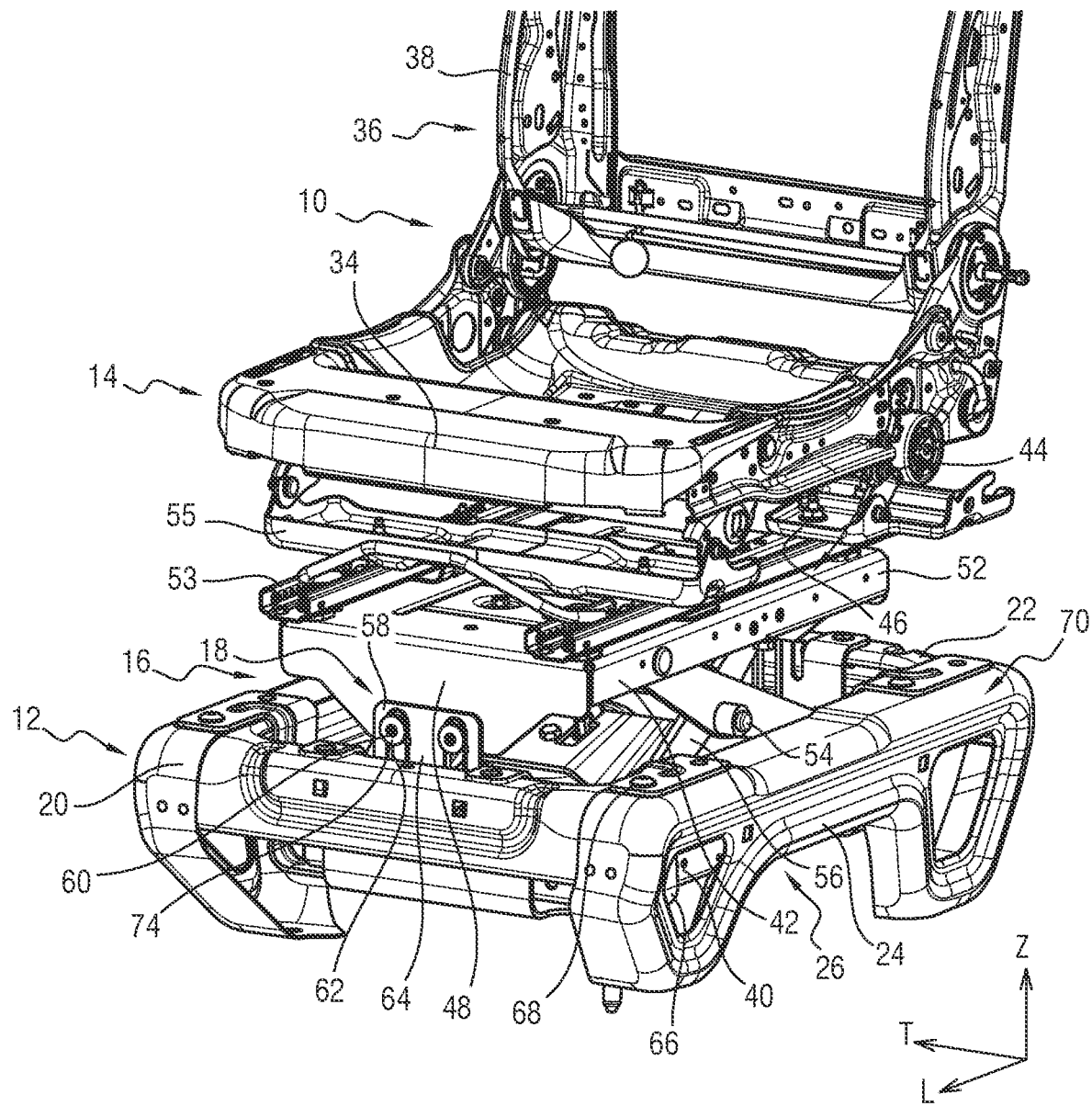
FIG. 2 is a perspective view of the seat of FIG. 1 wherein the adjustment and suspension device is in a high position.

FIGS. 1 and 2 show a vehicle seat 10 according to an embodiment of the invention.

The vehicle (not shown) is, for example, a commercial vehicle such as a van, truck, pickup truck, refrigerated vehicle, etc.

Alternatively, the vehicle is of any type.

The seat 10 is, for example, a driver's seat or a passenger's seat oriented along the longitudinal direction L towards the normal direction of travel of the vehicle.

The seat 10 comprises a frame 12 intended to be mounted on a floor of the vehicle, a seat cushion 14, an adjustment and suspension device 16 connected to the seat cushion 14, and a restraint system 18 restraining a portion of the adjustment and suspension device 16 on the frame 12.

The frame 12 comprises a front section 20 and a rear section 22, each extending in a direction substantially parallel to the transverse direction T, and two lateral sections 24 connecting the front and rear sections 22 and each extending in a direction parallel to the longitudinal direction L.

The frame 12 defines between the front 20, rear 22 and side 24 sections a central housing 26 receiving the adjustment and suspension device 16.

More particularly, each of the front 20, rear 22 and side 24 sections comprises an inner front wall, an inner rear wall and two inner side walls respectively defining the central housing 26 between them.

As known, the seat cushion 14 comprises, for example, a cushion (not shown) mounted on a framework 34.

The seat 10 further comprises, also as known, a backrest 36 connected to the seat cushion 14 and comprising a cushion (not shown) mounted on a framework 38.

The adjustment and suspension device 16 comprises a base 40 fixed to the frame 12 and a supporting plate 42 connected to the base 40 and fixed to the seat cushion 14.

The supporting plate 42 is movable in translation relative to the base 40 along the direction of elevation Z reversibly between a low position near the base 40, a high position away from the base 40 (FIG. 2), and a plurality of intermediate elevation positions (FIG. 1).

This allows for height adjustment of the position of the seat cushion 14 to adapt to the body size of its occupant.

The supporting plate 42 comprises an upper surface 44 fixed to a lower surface 46 of the seat cushion 14, a front wall 48, a rear wall 50, and two side walls 52 connected to the front and rear walls 48, 50. The front 48, rear 50, and side walls 52 are connected to the upper wall 44.

By "fixed to a lower surface of the seat", it is meant that the supporting plate 42 is fixed either directly without an intermediate element to the lower surface 46 of the seat cushion 14, or through one or more intermediate elements.

In the first embodiment, the seat 10 further comprises two guide rails 53 fixed to the upper surface 44 of the supporting plate 42 interacting with two fixing members 55 fixed to the lower surface 46 of the seat cushion 14 allowing the seat cushion 14 to be movable in translation with respect to the supporting plate 42 along the longitudinal direction L. This allows the occupant of the seat 10 to move forward or backward in relation to the dashboard.

In each of the elevated positions, the upper surface 44 of the supporting plate 42 extends primarily in an upper plane substantially perpendicular to the direction of elevation Z, that is, in a plane substantially parallel to the vehicle floor when the seat 10 is fixed to the vehicle floor.

The front 48, rear 50 and side 52 walls extend primarily in a plane substantially perpendicular to the upper plane.

The front 48, rear 50, and side 52 walls of the supporting plate 42 face the inner front, inner rear, and inner side walls of the frame 12, respectively, at least in the lowered position of the supporting plate 42.

As known, the adjustment and suspension device 16 further comprises at least one damping element (not shown) intended for damping the movement of the seat cushion 14 along the direction of elevation Z. This limits the vibrations felt by the occupant of the seat 10 when the vehicle is in motion.

The base 40 and the supporting plate 42 are connected to each other by a mechanism 54 known in the prior art.

For example, the mechanism 54 comprises scissor-like connection elements 56 connecting the supporting plate 42 and the base 40 of the adjustment and suspension device 16. This maintains the upper surface 44 of the supporting plate 42 substantially parallel to the vehicle floor in all elevation positions.

The adjustment and suspension device 16 comprises, for example, an actuator (not shown) that allows the occupant of the seat 10 to move the supporting plate 42, and therefore the seat cushion 14, between the different elevation positions.

The actuation of the adjustment and suspension device 16 is, for example, hydraulic, pneumatic or electric.

The restraint system 18 ensures a connection between the supporting plate 42 of the adjustment and suspension device 16 and the frame 12.

The restraint system 18 comprises—at least one restraint member 58 fixed to the frame 12 and at least one restraint element 60 fixed to the supporting plate 42.

In the first embodiment, the restraint system 18 comprises two restraint members 58 fixed to the frame 12, and two restraint elements 60 fixed to two opposing walls 48, 50; 52 of the supporting plate 42.

In the first embodiment (FIGS. 1 through 3), the restraint elements 60 are fixed to the front 48 and rear 50 walls of the supporting plate 42.

Each restraint member 58 defines at least one through opening 62 extending primarily along a main direction of elongation substantially parallel to the direction of elevation Z.

According to a first embodiment, each restraint member 58 comprises two through openings 62 each extending along a main direction of elongation substantially parallel to the direction of elevation Z. In other words, the two through openings 62 are parallel to each other.

The two openings 62 have the same dimension along the direction of elongation.

For example, the dimension along the direction of elongation is between 5 cm and 30 cm.

Preferably, the restraint members 58 are arranged opposite each other on opposite sides of the frame 12.

More particularly, each restraint member 58 preferably comprises a main plate 64 defining the opening(s) 62 and extending primarily along a elongation plane substantially parallel to the direction of elevation Z.

Figure 3:
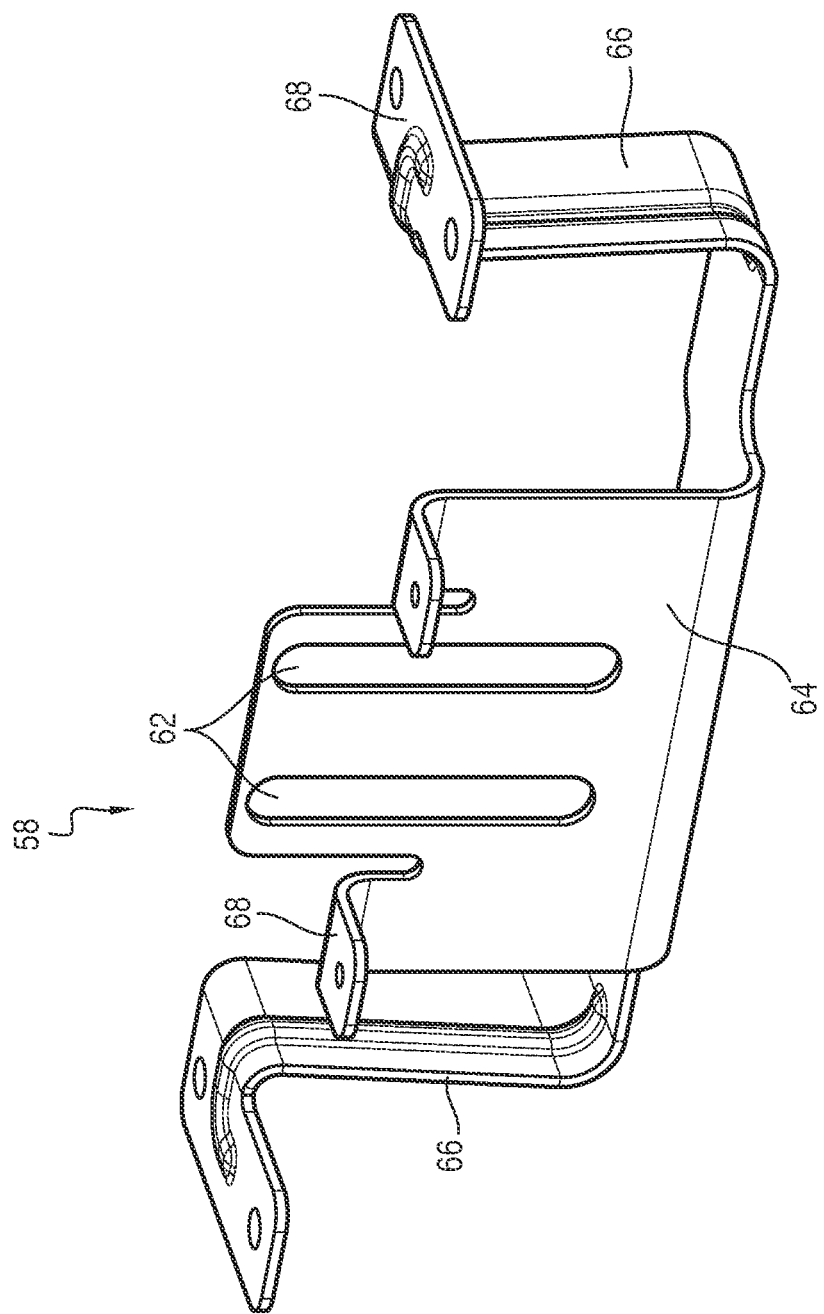
FIG. 3 is a perspective view of the restraint member of the seat of FIG. 1.

As more particularly visible in FIG. 3, each restraint member 58 further comprises two secondary plates 66 connected to the main plate 64 and each extending primarily in a plane substantially perpendicular to the elongation plane of the main plate 64.

More particularly, in the first embodiment, the main plate 64 of each of the restraint members 58 is fixed to the front section 20 and the rear section 22 of the frame 12, respectively.

Each main plate 64 extends at least partially projecting from the top surface 70 of the front section 20 and rear section 22 of the frame 12.

Preferably, each main plate 64 is fixed substantially equidistant from the side sections 24 of the frame 12 along the front section 20 and the rear section 22 of the frame 12.

Thus, the through openings 62 are arranged substantially symmetrically on either side of a median plane of elevation passing through a direction parallel to the longitudinal direction L.

In a particular embodiment in which the primary plate 64 defines a single through opening 62, the restraint member 58 is fixed to the frame 12 so that the opening 62 is equidistant from the side sections 24 of the frame 12.

The secondary plates 66 of each of the restraint members 58 are fixed to the side sections 24 of the frame 12.

Preferably, each restraint member 58 comprises fixing brackets 68 fixing the restraint member 58 to the frame 12.

In the first embodiment, each restraint member 58 comprises two fixing brackets 68 connected to the main plate 64 and two fixing brackets 68 connected to the secondary plates 66, respectively.

The fixing brackets 68 extend primarily in a plane substantially perpendicular to the elongation plane of each of the respective plates 64, 66.

The fixing brackets 68 are held bearing against an upper surface 70 of each of the front 20, rear 22 and side 24 sections of the frame 12.

Preferably, at least a portion of each main plate 64 of each of the restraint members 58 bears against the inner front wall and the inner rear wall of the frame 12. Similarly, at least a portion of each of the secondary plates 66 of each of the restraint members 58 bears against an interior side wall of the frame 12.

This distributes the forces over the entire frame 12 in the event of an impact when the supporting plate 42 is subjected to a pushing force along the longitudinal direction L. The mechanical strength of the restraint members 58 is improved and the deformation of the restraint members 58 is limited.

The restraint member 58 is preferably metallic.

In the first embodiment, the restraint system 18 comprises two restraint elements 60 fixed to the front wall 48 of the supporting plate 42 and two restraint elements 60 fixed to the rear wall 50 of the supporting plate 42.

Each restraint element 60 extends from its respective wall 48, 50 in a direction substantially perpendicular to the respective wall 48, 50 and substantially parallel to the longitudinal direction L.

Each restraint element 60 comprises, for example, a rod fixed to the wall 58, 60 of the supporting plate 42 and a head 74 connected to the rod.

The restraint element 60 is for example formed by a screw, bolt or metal pin.

Each through opening 62 of the restraint members 58 receives one of the restraint elements 60 free in translation along the main direction of elongation, the through opening 62 restraining said restraint element 58 along a restraint direction substantially parallel to the longitudinal direction L in the event of an impact of the vehicle, particularly in the event of an impact in the longitudinal direction L (full frontal impact or rear impact) or of any impact comprising a component along the longitudinal direction L. In other words, the through opening 62 restrains the restraint element 58 along the restraint direction when a force greater than a predetermined force is applied to the supporting plate 42 along the longitudinal direction.

Thus, upon actuation of the adjustment and suspension device 16, that is, when the supporting plate 42 moves to one of the elevated positions, the restraint element 60 slides in the through opening 62 along the main direction of elongation of the opening 62.

The head 74 of the restraint element 60 has a transverse dimension greater than the transverse dimension of the opening 62. Thus, the head 74 of the restraint element 60 cannot pass through the opening 62 along the longitudinal direction L. This prevents the supporting plate 42 from moving relative to the frame along the longitudinal direction L in the event of an impact.

Figure 4:
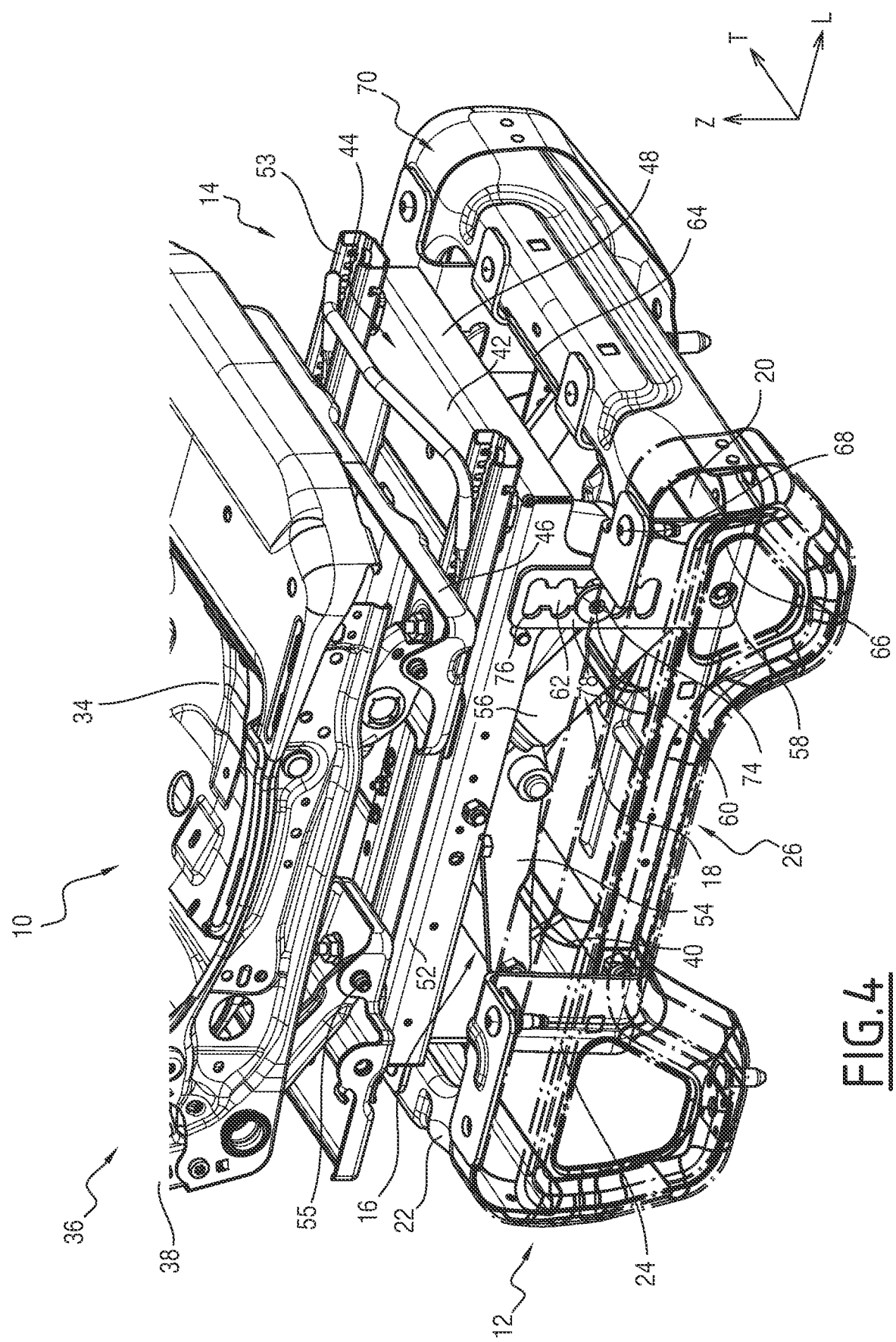
FIG. 4 is a perspective view of a seat according to a second embodiment of the invention.
Figure 5:
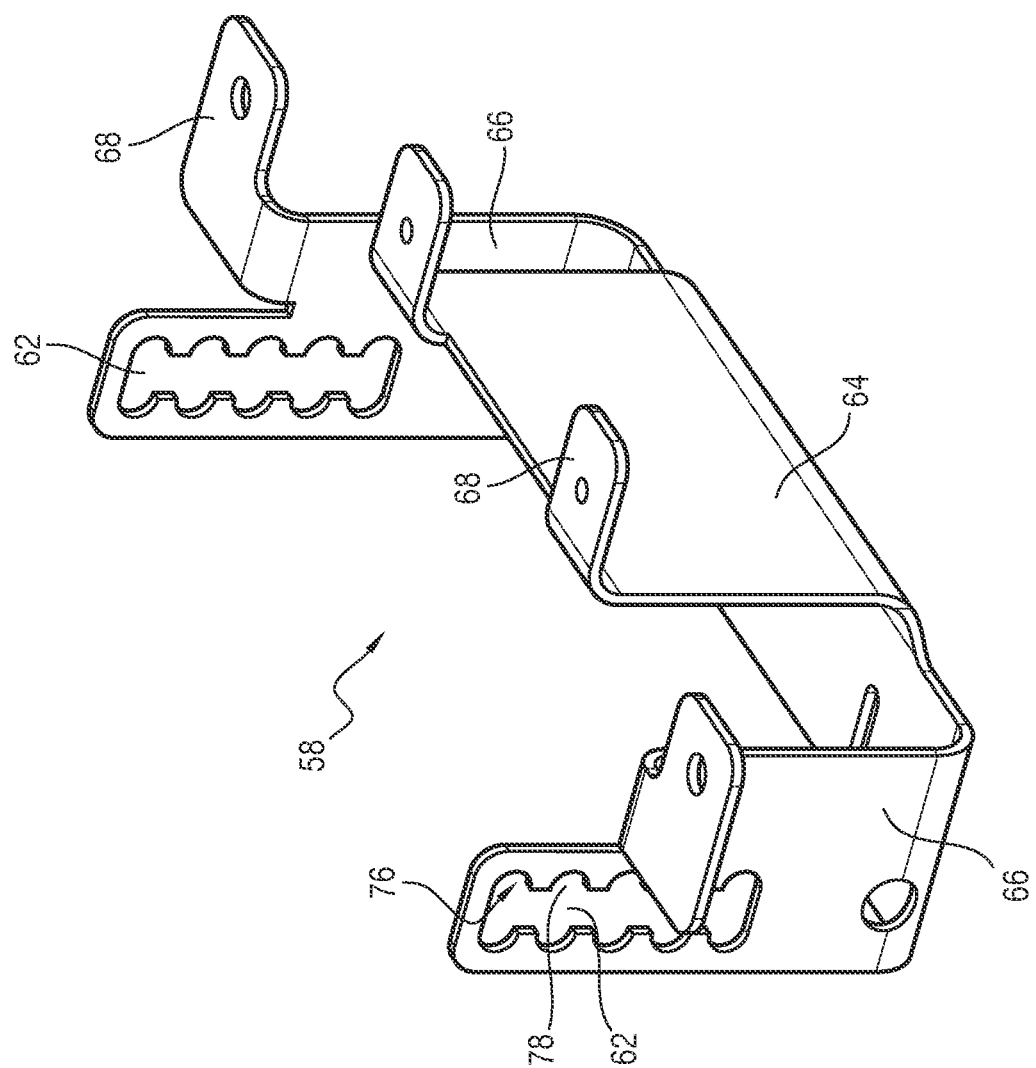
FIG. 5 is a perspective view of the restraint member of the seat of FIG. 4.

FIGS. 4 and 5 show a seat 10 according to a second embodiment of the invention.

This embodiment will be described by its differences in relation to the first embodiment.

In this embodiment, the main plate 64 of the restraint member 58 does not comprise an opening 62. It is the secondary plates 66 that each define at least one through opening 62 extending along a main direction of elongation substantially parallel to the direction of elevation Z.

In this embodiment, each secondary plate 66 comprises a single through opening 62.

The secondary plates 66 extend along a main elongation plane substantially parallel to the longitudinal direction L.

Each secondary plate extends at least partially projecting over the upper surface 70 of the side sections 24 of the frame 12.

Advantageously, an edge 76 of the opening 62 of each of the plates 66 defines a plurality of restraint housings 78 adapted to restrain the restraint element 60 received in the opening 62 along the direction of restraint. Each restraint housing 78 has at least one substantially circular or curvilinear portion forming an abutment for the shaft of the restraint element 60 in the event of movement of the plate along the longitudinal direction L. This allows the supporting plate 42 to be well held by the restraint member 58 in the event of a vehicle impact by preventing any sliding along the direction of elevation Z of the restraint element 60 along the edge 76 of the opening 62.

In this embodiment, the restraint member 58 further restrains the restraint element 60 along a restraint direction substantially parallel to the transverse direction.

In this embodiment, the main plate 64 preferably bears fully against the inner front wall of the front section 20 of the frame 12. The secondary plates 66, for example, at least partially bears against the inner side walls of the side sections 24 of the frame 12.

The restraint elements 60 are fixed to the side walls 52 of the plate. More particularly, each restraint element 60 extends from its respective wall 48, 50 in a direction substantially perpendicular to the respective wall 48, 50 and substantially parallel to the transverse direction T.

In this particular embodiment, the restraint system 18 comprises a single restraint element 60 on each of the side walls 52 of the supporting plate 42.

Of course, in a variant, the restraint system 18 may comprise a plurality of restraint elements fixed to the side walls 52 of the plate. In this case, the restraint members 58 comprise the same number of through openings 62 for receiving these restraint elements 60.

Thus, the seat described above is particularly advantageous because, thanks to the restraint members and the restraint elements, the plate for the adjustment and suspension device cannot move forward in the longitudinal direction relative to the frame during an impact of the vehicle, and this is true regardless of the position of the plate in the elevational direction.

In particular, during impact, the plate and the seat cushion can no longer rotate relative to the frame, and the movement of the seat occupant's pelvis is limited.

The invention claimed is:

1. A seat for a vehicle, said seat comprising:
   a frame configured to be mounted on a floor of the vehicle,
   a seat cushion, and
   an adjustment and suspension device comprising a base fixed to the frame and a supporting plate supporting the seat cushion, the supporting plate being fixed to a lower surface of the seat cushion, the supporting plate being mounted movable in translation relative to the base in a direction of elevation,
   wherein the seat further comprises a restraint system restraining the supporting plate of the adjustment and suspension device on the frame, the restraint system comprising:
   at least one restraint member fixed to the frame, the at least one restraint member defining at least one through opening extending along a main direction of elongation parallel to the direction of elevation, and
   at least one restraint element fixed to the supporting plate, the at least one through opening of the at least one restraint member receiving the at least one restraint element free in translation along the main direction of elongation, the at least one through opening being capable of restraining said at least one restraint element along a restraint direction perpendicular to the vertical direction in the event of vehicle impact,
   the supporting plate mainly extending in a plane perpendicular to the direction of elevation, and the supporting plate being arranged below the seat cushion according to the direction of elevation.

2. The seat according to claim 1, wherein the at least one restraint member comprises two restraint members fixed to the frame, each of the two restraint members defining at least one through opening extending along a main direction of elongation parallel to the direction of elevation, and the at least one restrain element comprises at least two restraint elements fixed to two walls opposite the supporting plate, the two walls mainly extending along a longitudinal direction or along a transverse direction, the longitudinal and transverse directions being perpendicular to the direction of elevation.

3. The seat according to claim 2, wherein the two restraint members are arranged opposite each other on opposite sides of the frame.

4. The seat according to claim 1, wherein the at least one restraint element protrudes from a wall to which said at least one restraint element is fixed.

5. The seat according to claim 1, wherein the frame defines a central housing receiving the adjustment and suspension device.

6. The seat according to claim 1, wherein the at least one restraint member defines two through openings each extending along a direction of elongation parallel to the direction of elevation, the supporting plate comprising four restraint elements received in pairs in each of the two through openings of the at least one restraint member.

7. The seat according to claim 1, wherein the at least one restraint member comprises at least one plate defining the at least one through opening and mainly extending along an elongation plane at least partly projecting from an upper surface of the frame, said elongation plane being parallel to the direction of elevation.

8. The seat according to claim 7, wherein the elongation plane of the at least one plate is parallel to the transverse direction.

9. The seat according to claim 7, wherein the frame comprises a front section and a rear section mainly extending along a direction parallel to the transverse direction and two side sections connecting the front and rear sections mainly extending along a direction parallel to the longitudinal direction, the at least one plate being fixed equidistant from the two side sections along the front section and rear section.

10. The seat according to claim 7, wherein the elongation plane of the at least one plate is parallel to the longitudinal direction, an edge of the at least one through opening defining a plurality of restraint housings adapted to restrain the at least one restraint element received in the at least one through opening along the direction of restraint.

11. The seat according to claim 1, wherein the supporting plate is movable in translation relative to the base along the direction of elevation reversibly between a low position, a high position, and a plurality of intermediate elevation positions between the low position and the high position, the supporting plate being closer to the base in the low position than in the high position.

12. The seat according to claim 11, wherein the adjustment and suspension device further comprises an actuator configured to move the supporting plate and the seat cushion between the low position, the high position, and the intermediate elevation positions.

* * * * *